US009020905B2

(12) United States Patent
Corkill et al.

(10) Patent No.: US 9,020,905 B2
(45) Date of Patent: Apr. 28, 2015

(54) SYNCHRONIZING DATABASE AND NON-DATABASE RESOURCES WITHOUT A COMMIT COORDINATOR

(75) Inventors: Brian L. Corkill, Tucson, AZ (US);
Colin S. Dawson, Tucson, AZ (US);
Erika M. Dawson, Tucson, AZ (US);
Kevin S. Goldsmith, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 611 days.

(21) Appl. No.: 12/610,281

(22) Filed: Oct. 31, 2009

(65) Prior Publication Data

US 2011/0106760 A1     May 5, 2011

(51) Int. Cl.
*G06F 17/30*     (2006.01)

(52) U.S. Cl.
CPC ...... *G06F 17/30377* (2013.01); *G06F 17/3056* (2013.01); *G06F 17/30227* (2013.01)

(58) Field of Classification Search
CPC .................................................. G06F 17/3056
USPC ......................................................... 707/679
See application file for complete search history.

(56) References Cited

U.S. PATENT DOCUMENTS

| | | | |
|---|---|---|---|
| 5,437,027 A | 7/1995 | Bannon et al. | |
| 5,884,327 A * | 3/1999 | Cotner et al. ........................ | 1/1 |
| 5,953,719 A * | 9/1999 | Kleewein et al. .................... | 1/1 |
| 5,983,235 A | 11/1999 | Blackman et al. | |
| 6,029,160 A | 2/2000 | Cabrera et al. | |
| 6,453,356 B1 | 9/2002 | Sheard et al. | |
| 6,571,259 B1 | 5/2003 | Zheng et al. | |
| 6,873,995 B2 * | 3/2005 | Laue et al. ..................... | 707/607 |
| 6,915,510 B1 | 7/2005 | Tock et al. | |

(Continued)

FOREIGN PATENT DOCUMENTS

| | | |
|---|---|---|
| CA | 2549694 A1 | 1/2007 |
| CN | 101460930 A | 6/2009 |

OTHER PUBLICATIONS

Yao, D; Shahabi, Cyrus; Larson; Per-Ake, "Hash-based labeling techniques for storage scaling," The VLDB Journal—The International Journal on Very Large Data Bases archive, vol. 14, Issue 2, Apr. 2005, pp. 222-237, Springer-Verlag, New York.

(Continued)

*Primary Examiner* — James Trujillo
*Assistant Examiner* — Kurt Mueller
(74) *Attorney, Agent, or Firm* — Nelson and Nelson; Daniel P. Nelson; Alexis V. Nelson (57) ABSTRACT

A system to synchronize a database and a non-database resource includes an application to transmit a request to a service provider to perform an action. The service provider receives the request and performs the action, the action not being under commit coordination. The service provider further inserts an entry into an action-reversal table to reverse the action and makes the insertion permanent. The service provider, on behalf of the application, then deletes the entry from the action-reversal table. The application may then be configured to perform one of the following: (1) make the delete permanent by performing a COMMIT; and (2) roll back the delete by performing a ROLLBACK. At a later time, the service provider may reverse the action in the event the entry remains in the action-reversal table. Corresponding methods and articles of manufacture (i.e., computer-readable media) are also disclosed herein.

25 Claims, 7 Drawing Sheets

(56) References Cited

U.S. PATENT DOCUMENTS

| | | |
|---|---|---|
| 7,412,455 B2 | 8/2008 | Dillon |
| 7,448,035 B2 | 11/2008 | Dorrance et al. |
| 7,478,115 B2 | 1/2009 | Purtell et al. |
| 7,912,858 B2 * | 3/2011 | Fleck et al. .................. 707/783 |
| 8,271,448 B2 * | 9/2012 | Parkinson et al. ............ 707/661 |
| 8,356,007 B2 * | 1/2013 | Larson et al. ................. 707/610 |
| 2002/0174103 A1 | 11/2002 | Hsiao et al. |
| 2002/0194242 A1 * | 12/2002 | Chandrasekaran et al. .. 709/101 |
| 2003/0069902 A1 | 4/2003 | Narang et al. |
| 2003/0126163 A1 * | 7/2003 | Kim et al. ..................... 707/204 |
| 2003/0200212 A1 | 10/2003 | Benson et al. |
| 2004/0030703 A1 | 2/2004 | Bourbonnais et al. |
| 2005/0210081 A1 * | 9/2005 | Fleck et al. ................... 707/204 |
| 2006/0253502 A1 | 11/2006 | Raman et al. |
| 2007/0150509 A1 | 6/2007 | Lev et al. |
| 2008/0162590 A1 * | 7/2008 | Kundu et al. ................. 707/202 |
| 2009/0106326 A1 * | 4/2009 | Antani et al. ................. 707/202 |
| 2011/0029490 A1 * | 2/2011 | Agarwal et al. .............. 707/684 |
| 2011/0161288 A1 * | 6/2011 | Morimoto et al. ............ 707/611 |
| 2011/0191299 A1 * | 8/2011 | Huynh Huu et al. ......... 707/646 |
| 2012/0102006 A1 * | 4/2012 | Larson et al. ................. 707/703 |

OTHER PUBLICATIONS

Davis, Judith R., "Datalinks: Managing External Data with DB2 Universal Database." Prepared for the IBM Corporation by InfoIT, Inc., a Database Associates Company, 2007.

Elmasri, R., et al., "Fundamentals of Database Systems," Excerpts from Chapters 17, 18, and 19, Addison-Wesley, Jan. 1, 2004, ISBN 978-0-321-20448-6, pp. 551-635.

Elmasri, R., et al., "Fundamentals of Database Systems," Excerpts from Chapters 7,9, 17, and 18, Addison-Wesley, Jan. 1, 2004, ISBN 978-0-321-20448-6, pp. 212-215, 276-283, and 527-575.

Amendment, Application No. 11 2010 004 185.7, Richardt European Patent Attorneys, Munich, Germany, Oct. 10, 2013.

Office Action, German Patent Office, Application No. 11 2010 004 185.7, Munich, Germany, Aug. 12, 2013.

* cited by examiner

SYNCHRONIZING DATABASE AND NON-DATABASE RESOURCES WITHOUT A COMMIT COORDINATOR

FIELD OF THE INVENTION

This invention relates to database and non-database resources, and more particularly to apparatus and methods for performing commit coordination for database and non-database resources.

BACKGROUND OF THE INVENTION

A database transaction is a unit of work performed by a database management system (DBMS) or other application associated with a database. Transactions are generally performed using an "all-or-nothing" approach, meaning that all work units associated with a transaction must complete or none must complete. A "commit coordinator" built into a DBMS or application may ensure that a transaction completes in its entirety or not at all.

For example, consider a financial transaction where an application performs several steps using an "all-or-nothing" approach. In particular, the application transfers funds from a checking account to a savings account using the following steps (listed in pseudo code):
  begin transaction
    debit checking account
    credit savings account
    update history log
  commit transaction
All of the three steps must complete, or none must complete. Otherwise, data integrity will be lost. Because the steps within a transaction are processed as a whole, a transaction may be defined as an indivisible unit of work.

A transaction may terminate in one of two different ways, namely with a COMMIT or a ROLLBACK statement. When a transaction ends with a COMMIT statement (hereinafter referred to as a "COMMIT"), data modifications specified by the transaction are made permanent in the database. If, on the other hand, one or more data modifications in the transaction fail, a ROLLBACK statement (hereinafter referred to as a "ROLLBACK") may be used to undo the effects of all statements in the transaction. For example, if a disk drive were to crash during the "credit savings account" step listed above, a ROLLBACK statement could be executed in order to undo the data modifications made by the "debit checking account" statement. Although the transaction failed, data integrity would remain intact to keep the accounts balanced.

Unfortunately, an application may perform certain actions or cause certain actions to occur that fall outside of the application's normal "commit coordination." For example, consider an application that invokes, as part of a transaction, a service provider to perform some action, such as store a large image file in a file system. The service provider and file system may have no knowledge of the transaction. Thus, the actions performed by the service provider may fall outside the application's "commit coordination." In other words, the application may be unable to reverse actions performed by the service provider if the application ultimately performs a ROLLBACK. Likewise, the service provider may have no knowledge of the ROLLBACK and thus will also be unable to take actions to reverse the action. Using the above example, such a scenario may lead to orphaned files in the file system that were not reversed (i.e., deleted from the file system) in response to a ROLLBACK.

In view of the foregoing, what is needed is an apparatus and method to reverse actions performed by a service provider or other entity acting outside an application's normal commit coordination. Such an apparatus and method would ideally be implemented without the need to modify the application and/or DBMS. Such an apparatus and method would also ideally leverage existing functionality in the application and/or DBMS.

SUMMARY

The invention has been developed in response to the present state of the art and, in particular, in response to the problems and needs in the art that have not yet been fully solved by currently available apparatus and methods. Accordingly, the invention has been developed to provide apparatus and methods for performing commit coordination for database and non-database resources. The features and advantages of the invention will become more fully apparent from the following description and appended claims, or may be learned by practice of the invention as set forth hereinafter.

Consistent with the foregoing, a system to synchronize a database and a non-database resource is disclosed herein. In certain embodiments, such a system includes an application to transmit a request to a service provider to store an object. The service provider receives the request and stores the object as a file, wherein the file is a non-database resource. The service provider further inserts an entry into a new file-deletion table to delete the file and makes the insertion permanent by performing a COMMIT. The service provider, on behalf of the application, is configured to delete the entry from the file-deletion table. The application may then perform one of the following: (1) make the delete permanent by performing a COMMIT; and (2) roll back the delete by performing a ROLLBACK. At a later time, the service provider is configured to delete the file in the event the entry remains in the file-deletion-table. In this way, a file system that is not under commit coordination may be synchronized with an application that is under commit coordination.

In another aspect of the invention, a system to synchronize a database and a non-database resource includes an application to transmit a request to a service provider to perform an action. The service provider receives the request and performs the action, the action not being under commit coordination. The service provider further inserts an entry into an action-reversal table to reverse the action and makes the insertion permanent by performing a COMMIT. The service provider, on behalf of the application, then deletes the entry from the action-reversal table. The application may then be configured to perform one of the following: (1) make the delete permanent by performing a COMMIT; and (2) roll back the delete by performing a ROLLBACK. At a later time, the service provider is configured to reverse the action in the event the entry remains in the action-reversal table.

Corresponding methods and articles of manufacture (i.e., computer-readable media) are also disclosed and claimed herein.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, these embodiments will be described and explained with additional specificity and detail through use of the accompanying drawings, in which.

DETAILED DESCRIPTION

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

As will be appreciated by one skilled in the art, the present invention may be embodied as an apparatus, system, method, computer-readable medium, or computer program product. Furthermore, the present invention may take the form of a hardware embodiment, a software embodiment (including firmware, resident software, micro-code, etc.) configured to operate hardware, or an embodiment combining software and hardware aspects that may generally be referred to herein as a "module" or "system." Furthermore, the present invention may take the form of a computer program product embodied in any tangible medium of expression having computer-usable program code stored therein.

Any combination of one or more computer-usable or computer-readable medium(s) may be utilized to store the computer program product. The computer-usable or computer-readable medium may be, for example but not limited to, an electronic, magnetic, optical, electromagnetic, infrared, or semiconductor system, apparatus, or device. More specific examples (a non-exhaustive list) of a computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, or a magnetic storage device. In the context of this document, a computer-usable or computer-readable medium may be any medium that can contain, store, or transport a program for use by or in connection with the instruction execution system, apparatus, or device.

Computer program code for carrying out operations of the present invention may be written in any combination of one or more programming languages, including an object-oriented programming language such as Java, Smalltalk, C++, or the like, and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Embodiments of the invention are described below with reference to flowchart illustrations and/or block diagrams of methods, apparatus, systems, computer-readable mediums, and computer program products according to embodiments of the invention. It will be understood that each block of the flowchart illustrations and/or block diagrams, and combinations of blocks in the flowchart illustrations and/or block diagrams, can be implemented by computer program instructions or code. These computer program instructions may be provided to a processor of a general-purpose computer, special-purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 1:
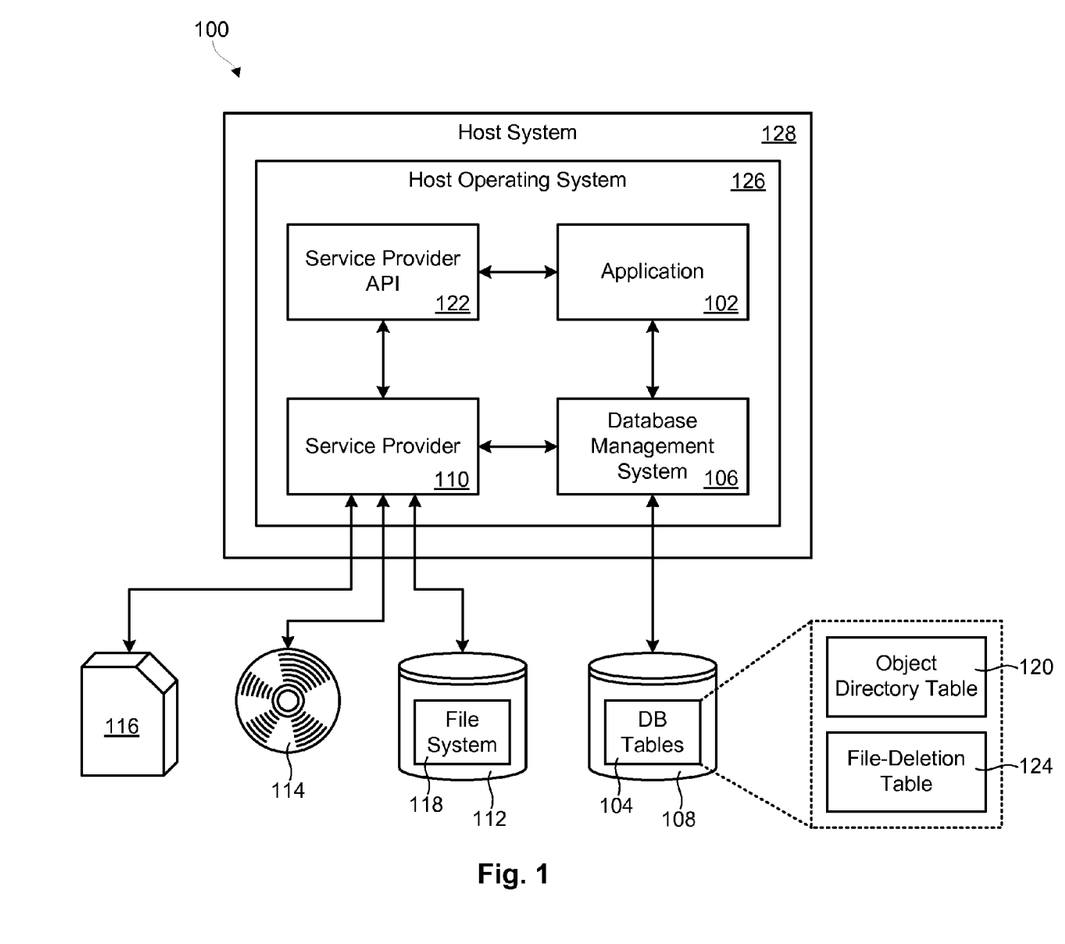
FIG. 1 is a high-level block diagram showing one example of an environment where an apparatus and method in accordance with the invention may operate.

Referring to FIG. 1, one example of an environment 100 where an apparatus and method in accordance with the invention may operate is illustrated. In this example, the environment 100 includes an application 102 configured to access a database comprising one or more database tables 104. This database may be accessed by way of a database management system 106 (e.g., DB2 or analogous DBMS 106). In certain embodiments, the database tables 104 are stored on disk drives 108 or other suitable storage devices such as solid-state drives 108 (i.e., SSDs). The application 102 may be responsible for synchronizing the database tables 104 to maintain data integrity and ensure that the data contained in the tables 104 is consistent. Thus, the application 102 may initiate "commit coordination" for data stored in the database tables 104.

In certain embodiments, the application 102 may communicate with a service provider 110 (such as "Object Access Method" (OAM) or other service provider) to provide one or more services. For example, the service provider 110 may enable the application 102 to store and retrieve "objects" in one or more storage devices, such as disk drives 112, optical drives 114, or tape drives 116. As an example, the service provider 110 may enable the application to store one or more objects as files in a file system 118. The application 102 may communicate with the service provider 110 by way of an application programming interface 122 (such as the OSREQ API where the service provider is OAM).

An "object" may, in certain embodiments, include any named sequence of bytes. For example, an object could be image data (such as a compressed scanned image) or coded data. The service provider 110 may have no knowledge of the content, format, and/or structure of the sequence of bytes.

In certain embodiments, when the application 102 directs the service provider 110 to store an object in the storage devices 112, 114, 116, metadata for the object may be stored in a database table 104, such as an object directory table 120. This metadata may include information to locate and manage the object, among other information. When the application 102 stores the object (using the service provider API 122), the service provider 110 may add a row (i.e., entry) to the object directory table 120 containing metadata for the stored object. However, the application 102 and not the service provider 110 may perform the COMMIT for that row. If the application ultimately performs a ROLLBACK, this will delete the entry for the object from the object directory table 120 but may leave the object orphaned in the file system 118. In other words, because the file system 118 is not under the "commit coordination" of the DBMS 106, the object may continue to exist in the file system 118 even though the record for the object has been deleted from the object directory table 120. Furthermore, if the application 102 once again attempts to store the same specifically named object in the file system 118 (such as might occur in a "store-rollback-store" scenario), the store operation may fail because the named object already exists in the file system 118.

Accordingly, it would be an advance in the art to provide an apparatus and method to reverse actions performed by a service provider 110 or other entity acting outside an application's commit coordinator. It would be a further advance to provide such an apparatus and method without modifying the application 102 and/or DBMS 106. Such an apparatus and method would ideally leverage existing functionality in the application 102 and/or DBMS 106.

To provide these features, in selected embodiments, a file-deletion table 124 is provided to act as a proxy for a resource residing outside a DBMS's commit coordination. The file-deletion table 124 is under the DBMS's commit coordination and therefore be used to keep non-database resources synchronized and consistent with database resources. The function and operation of the file-deletion table 124 as well as other functionality will be described in more detail in association with FIGS. 2 through 5.

In the illustrated example, the application 102, DBMS 106, and service provider 110 run within the same host operating system 126 residing on a host system 128 (e.g., a mainframe computer or other computing system). However, the components 102, 106, 110 do not necessarily need to run on the same operating system 126 or host system 128. For example, the components 102, 106, 110 may operate in different operating systems 126 or run on different host systems 128. In certain embodiments, the components 102, 106, 110 may operate on different computers that communicate with each other over a network (e.g., a LAN, WAN, the Internet, or the like). Thus, the illustrated hardware and software configuration is provided only by way of example and is not intended to be limiting.

Figure 2:
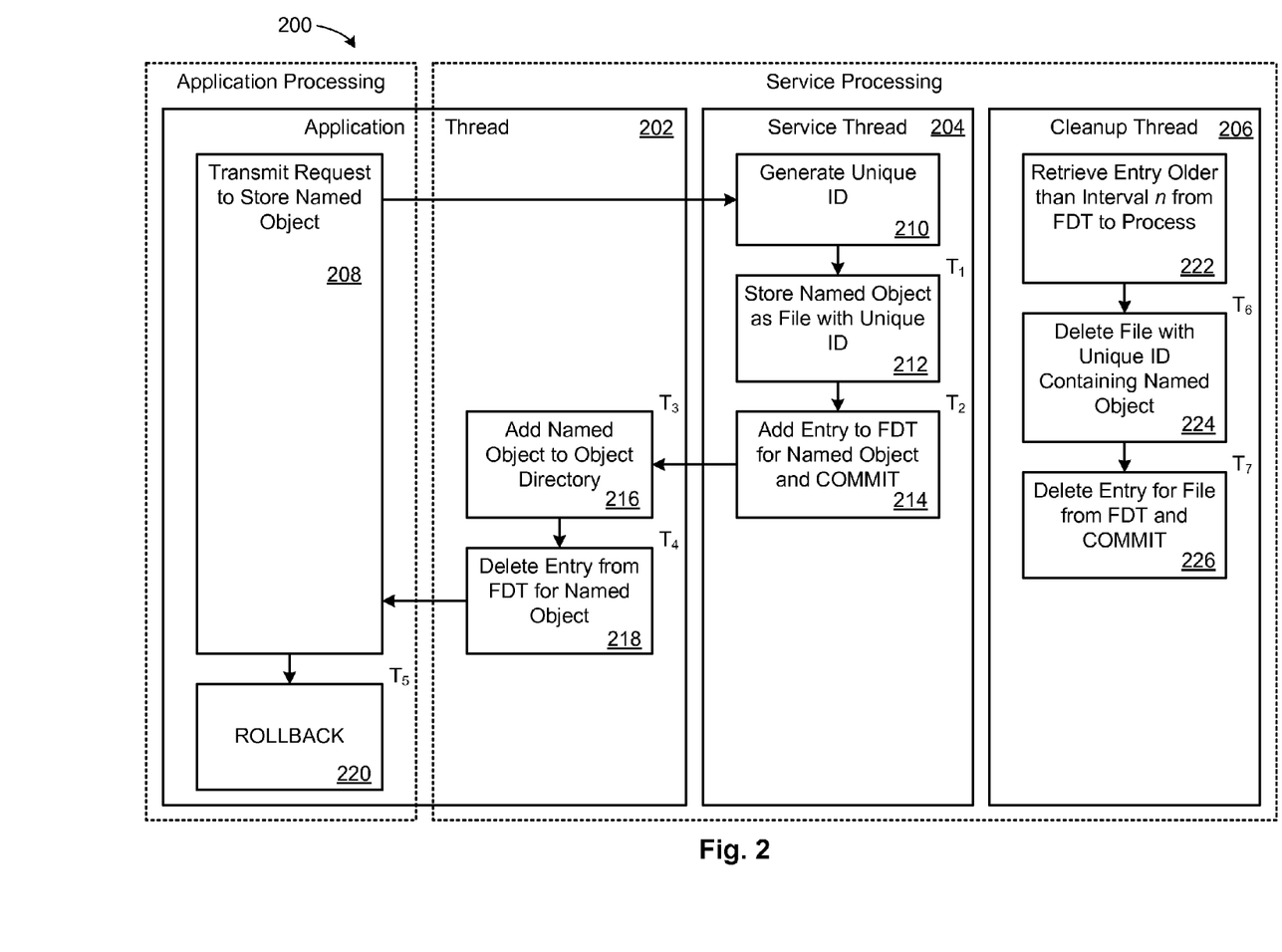
FIG. 2 is a flow diagram showing one embodiment of a method for synchronizing a database and a non-database resource when a ROLLBACK is performed.
Figure 3:
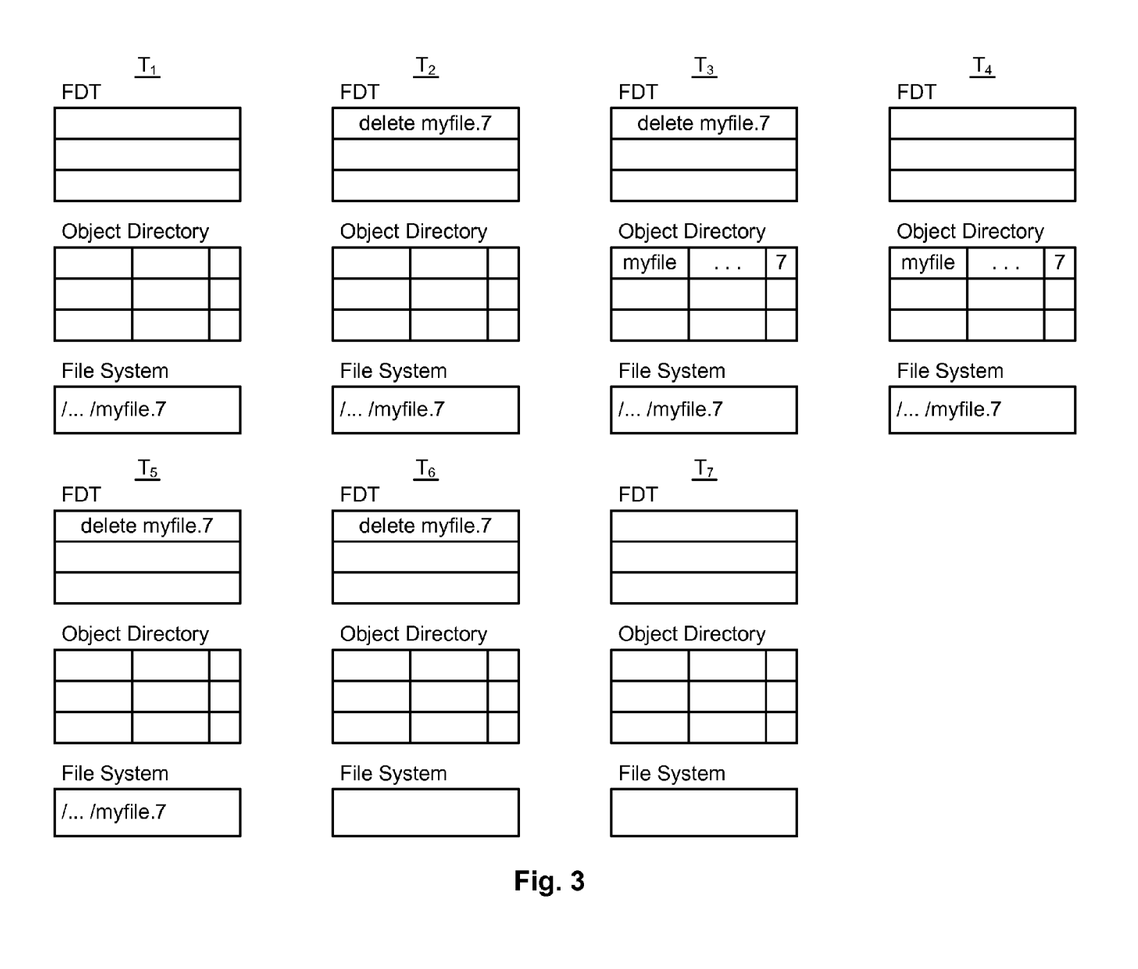
FIG. 3 shows the state of various data structures at different points in time when a ROLLBACK is performed.

Referring to FIG. 2, one embodiment of a method 200 for synchronizing a database and a non-database resource is illustrated. The method 200 of FIG. 2 shows a scenario where an application 102 performs a ROLLBACK of the work it has performed. FIG. 3 shows the states of various data structures at different points in time as the method 200 executes.

As illustrated in FIGS. 2 and 3, the application 102 (operating under an application thread 202) initially transmits 208 a request to a service provider 110 to store a named object. The service provider 110 (operating under a separate service thread 204) then generates 210 a unique identifier for the named object in order to differentiate the instance of the object from other instances of the named object. This differentiation may be important since the contents of an instance of a named object can be different from the contents of another instance of the same named object.

Operating under the service thread 204, the service provider 110 then stores 212 the named object as a file with a unique identifier in the file system 118. For example, as shown in FIG. 3, at time $T_1$, an object named myfile with the unique identifier "7" is stored as myfile.7 in the file system 118.

In anticipation that the application 102 may decide to roll back the request to store the named object, the service provider 110 adds 214 a "delete" entry to the file-deletion table 124 for the named object. The service provider may then perform 214 a COMMIT for this entry on the service thread 204 to make the entry permanent in the file-deletion table 124. For example, as shown at time $T_2$, the service provider 110 inserts the entry delete myfile.7 into the file-deletion table (FDT) 124. In essence, this makes the deletion of the file the default action to be performed by the service provider 110.

Operating under the application thread 202, the service provider 110 then adds 216 the named object to the object directory table 120, thereby indicating that the named object is stored in the file system 118. As shown at time $T_3$, the service provider 110 inserts metadata for the named object into the object directory table 120.

The service provider 110 then deletes 218 the entry from the file-deletion table 124 with the intent of eliminating the request to delete the named object. For example, as shown at time $T_4$, the service provider 110 removes the delete myfile.7 entry from the file-deletion table 124. The permanence of this deletion from the file-deletion table 124 will depend on the ultimate disposition of the transaction, and more specifically whether a COMMIT or ROLLBACK is ultimately executed by the application 102.

In this example, the application 102 eventually performs 220 a ROLLBACK, thereby reversing the work performed by the application 102. This will roll back the deletion of the delete myfile.7 entry, thereby adding it back to the file-deletion table 124. Thus, as shown at time $T_5$, the delete myfile.7 entry is restored to the file-deletion table 124 and the object's entry in the object directory table 120 is deleted. Note that the actual file remains in the file system 118. Further note that the service provider 110 is unaware that the application 102 has disposed of the transaction by performing a ROLLBACK.

In order to delete the file containing the named object from the file system 118, a cleanup thread 206 is executed by the service provider 110 at some future point in time. As shown, the service provider 110 initially retrieves entries from the file-deletion table 124 that are older than some interval n. The interval n may be selected such as to allow the application 102 enough time to dispose of the transaction (perform either a COMMIT or a ROLLBACK). This interval n may be on the order of seconds, minutes, hours, days, or weeks, depending on the application 102.

Once an entry older than some interval n has been retrieved, the service provider 110 deletes the file specified by the entry in the file-deletion table 124. This will synchronize the file system 118 with the object directory table 120, where the entry for the named object was already deleted by the ROLLBACK 220. As shown in FIG. 3, at time $T_6$, the file myfile.7 is deleted from the file system 118.

Finally, the service provider 110 deletes the entry from the file-deletion table 124 requesting the deletion of the named object. The service provider 110 performs a COMMIT for this change on the cleanup thread 206 to make it permanent. Thus, as shown at time $T_7$, the delete myfile.7 entry is deleted from the file-deletion table 124.

Due to the unique identifier associated with each named object, the application 102 may continue to perform actions for the same named object, even if the previous instance of the named object has still not been deleted from the file system 118. For example, if the application 102 were to attempt to store the same named object again before the previous instance had been deleted, the service provider 110 would generate a new unique identifier for the new instance (e.g., myfile.8). This instance could then be stored in the file system 118 without incurring an error due to a duplicate file name.

Figure 4:
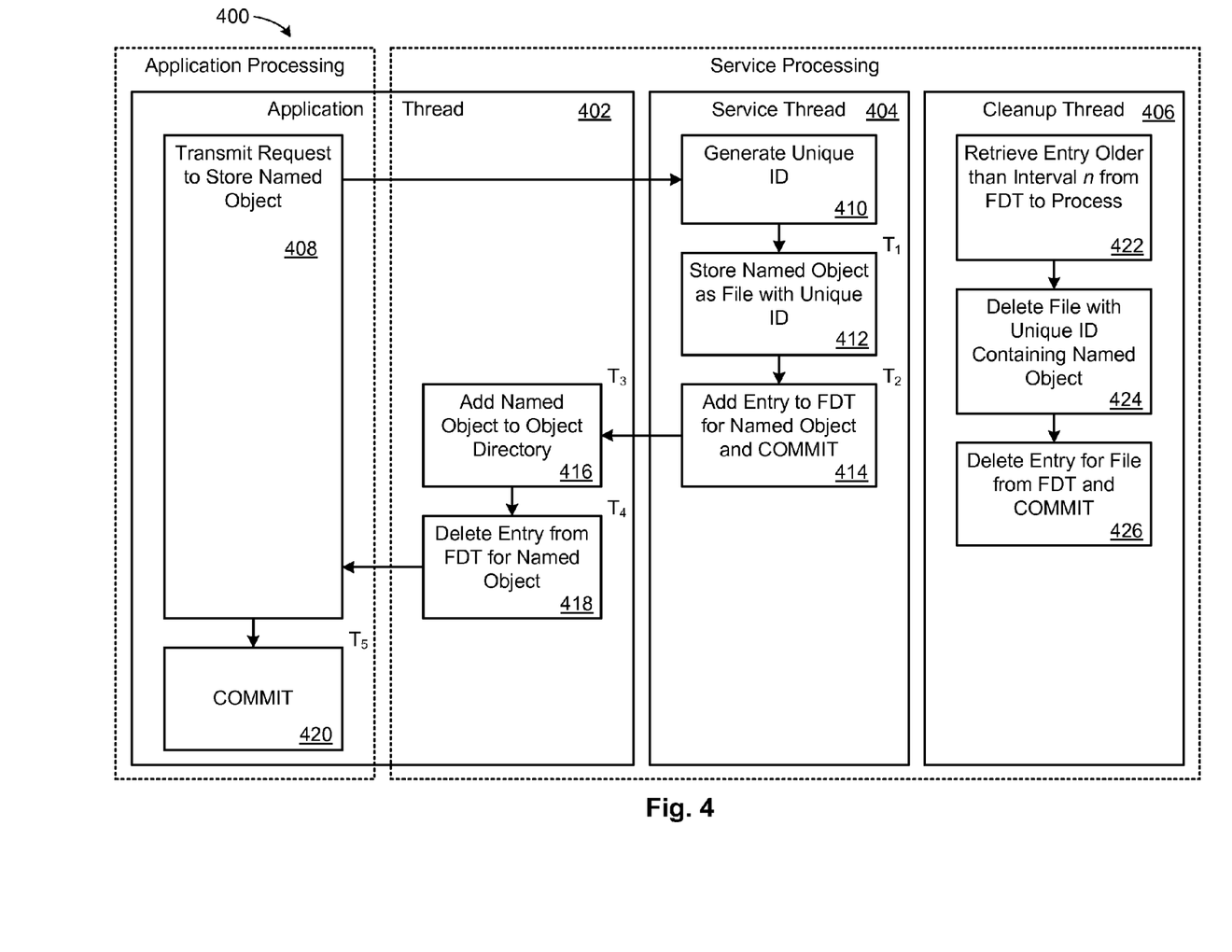
FIG. 4 is a flow diagram showing one embodiment of a method for synchronizing a database and a non-database resource when a COMMIT is performed.
Figure 5:
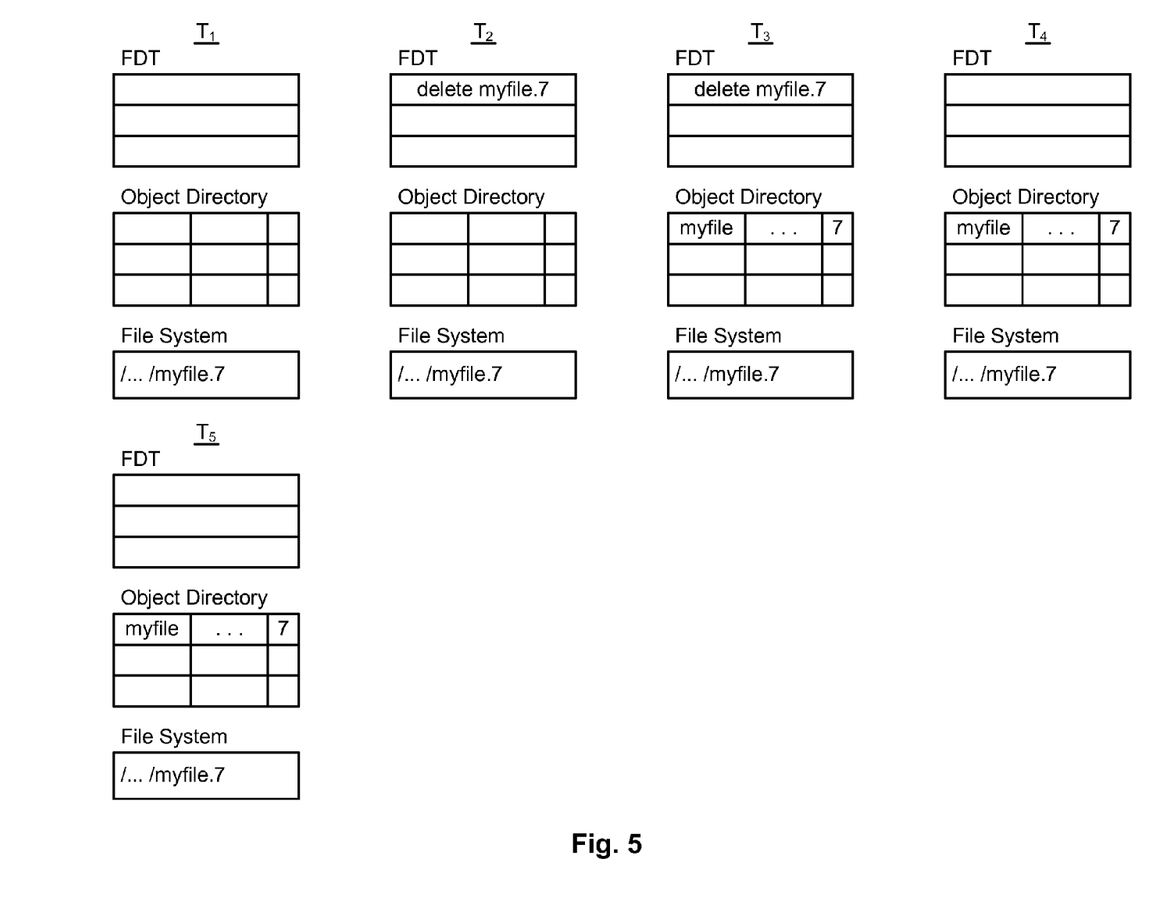
FIG. 5 shows the state of various data structures at different points in time when a COMMIT is performed.

Referring to FIG. 4, another embodiment of a method 400 for synchronizing a database and a non-database resource is illustrated. The method 400 of FIG. 4 shows a scenario wherein the application 102 performs a COMMIT. FIG. 5 shows the states of various data structures at different points in time as the method 400 is executed. The method 400 is the same as the method 200 illustrated in FIG. 2 up until the time the application 102 performs 420 a COMMIT (instead of a ROLLBACK).

As shown in FIG. 4, the application 102 performs 420 a COMMIT, thereby making work performed by the application 102 permanent. This will permanently delete the delete myfile.7 entry from the file-deletion table 124. Thus, as shown at time $T_5$ in FIG. 5, the delete myfile.7 entry is removed from the file-deletion table 124. The entry in the object directory table 120, however, is retained. Like the previous example, the service provider 110 is unaware that the application 102 has performed the COMMIT.

Like the previous example, a cleanup thread 406 is executed by the service provider 110 at some future point in time. Because the entry for the named object has been removed from the file deletion table 124, the cleanup thread 406 will not delete the myfile.7 file from the file system 118. This will ensure that the file system 118 stays synchronized with the object directory table 120.

Figure 6:
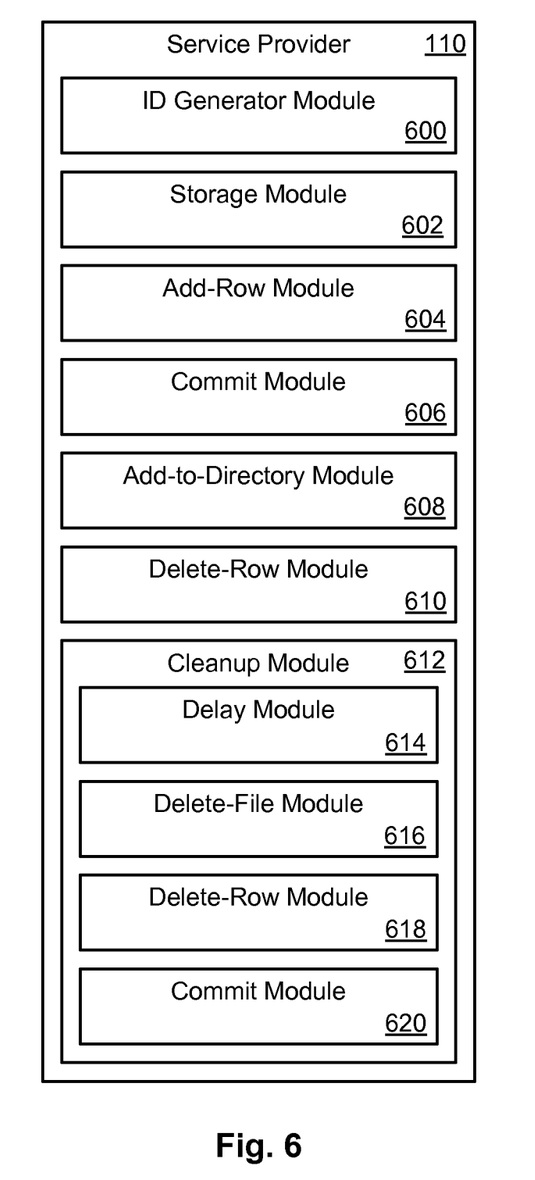
FIG. 6 is a high-level block diagram showing various modules that may be included in a service provider in accordance with the invention.

Referring to FIG. 6, in certain embodiments, a service provider 110 in accordance with the invention may be modified to implement the methods 200, 400 illustrated in FIGS. 2 and 4. Such a service provider 110 may include one or more modules to implement this functionality. These modules may be implemented in hardware, software or firmware executable on hardware, or a combination thereof. In selected embodiments, these modules include one or more of an ID generator module 600, a storage module 602, an add-row module 604, a commit module 606, an add-to-directory module 608, a delete-row module 610, and a cleanup module 612. These modules are presented only by way of example and are not intended to be limiting. In certain embodiments, more or fewer modules than those illustrated may be provided. In other embodiments, the functionality from certain modules may be combined into fewer modules or, conversely, be divided into several modules.

When the service provider 110 receives a request to store a named object, an ID generator module 600 generates a unique identifier for the named object in order to differentiate the instance of the object from other instances of the named object. A storage module 602 then stores the named object as a uniquely named file in the file system 118. Once the file has been stored, an add-row module 604 inserts a "delete" entry into the file-deletion table 124 for the named object on the service thread 204. A commit module 606 makes this entry permanent in the file-deletion table 124. This will make the deletion of the file the default action to be performed by the service provider 110.

Once the add-row module 604 has added a "delete" entry to the file-deletion table 124 and the entry has been committed, an add-to-directory module 608 adds 216 an entry associated with the named object to the object directory table 120 on the application thread 202. This will indicate that the named object is stored in the file system 118. A delete-row module 610 then deletes 218 the previously discussed "delete" entry from the file-deletion table 124 with the intent of eliminating the request to delete the named object. The permanence of this deletion will depend on the ultimate disposition of the transaction. At this point, the application 102 is responsible for performing either a COMMIT or ROLLBACK to make permanent or reverse the work performed by the application 102.

At some future point in time, a cleanup module 612 removes files from the file system 118 that have been identified for deletion in the file-deletion table 124. For example, a delay module 614 is configured to retrieve entries from the file-deletion table 124 that are older than some interval n. A delete-file module 616 then deletes any files that are identified in the entries. This will synchronize the file system 118 with the object directory table 120. Once a file has been deleted from the file system 118, a delete-row module 618 deletes the associated "delete" entry from the file-deletion table 124. A commit module 620 then performs a COMMIT to make the change permanent in the file-deletion table 124.

Figure 7:
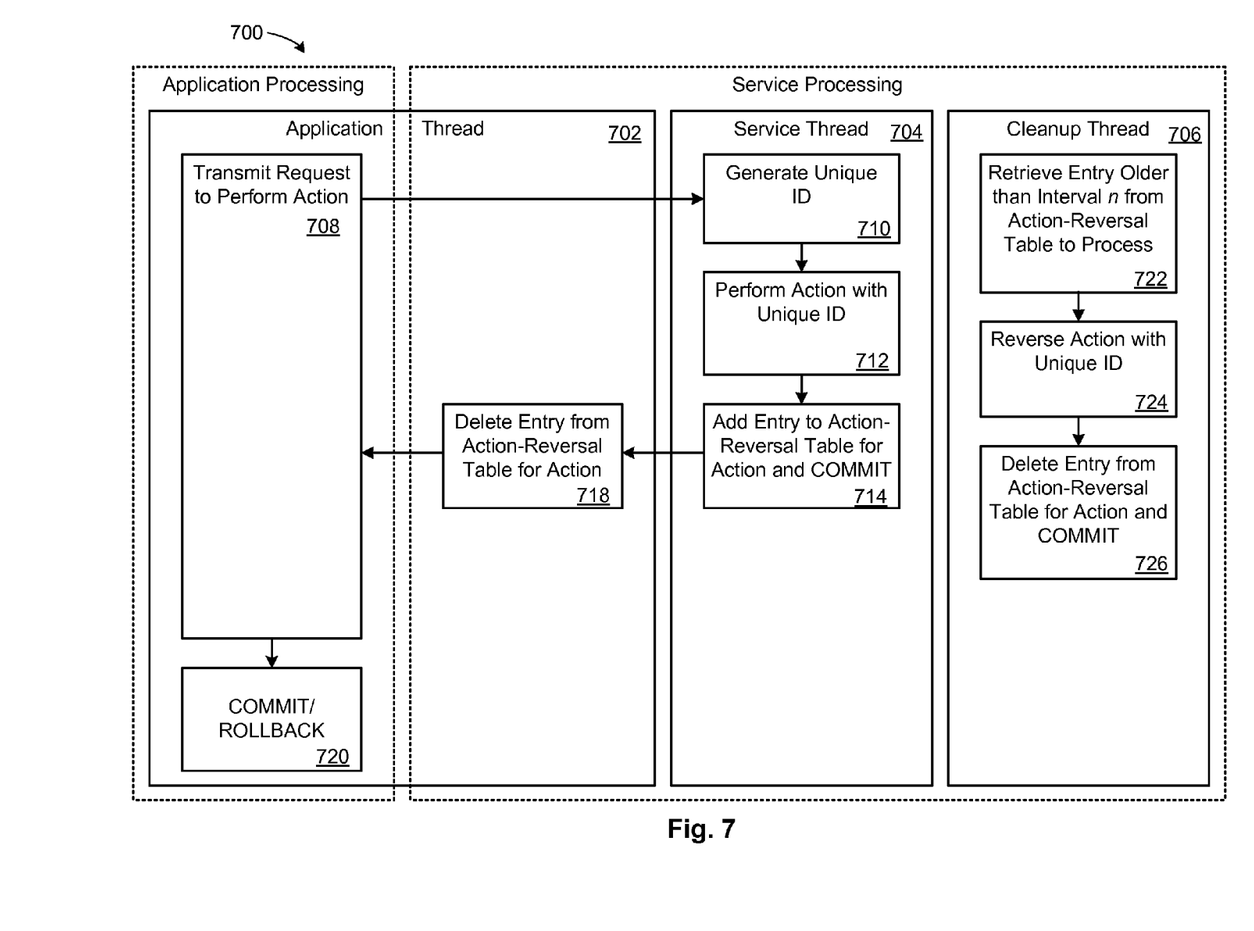
FIG. 7 is a flow diagram showing an alternative embodiment of a method for synchronizing a database and a non-database resource when a COMMIT and/or ROLLBACK is performed.

Referring to FIG. 7, although the apparatus and methods discussed herein have been discussed primarily in association with deleting files from a file system 118, the apparatus and methods discussed herein have much broader applicability. Indeed, deleting files from a file system 118 represents just one type of action that may be addressed by the apparatus and methods disclosed herein. In other embodiments, the apparatus and methods may be used to reverse a wide variety of actions that fall outside the normal "commit coordination" of an application 102 or DBMS 106. More specifically, a database table 124 may be used as a proxy to reverse a wide variety of actions when an application 102 ultimately disposes of a transaction, such as by performing a ROLLBACK. A broader method 700, which encompasses the methods described in FIGS. 2 and 4, is illustrated in FIG. 7.

As illustrated in FIG. 7, an application 102 (operating under an application thread 702) initially transmits 708 a request to a service provider 110 to perform some action. This action could include virtually anything, such as storing a file, executing a program, generating an object or artifact, performing a service, or the like. In certain embodiments, the service provider 110 (operating under a separate service thread 704) generates 710 a unique identifier for this action in order to differentiate the action from other actions. The service provider 110 then performs 712 the action with the unique identifier.

In anticipation that the application 102 may decide to roll back the request to perform the action, the service provider 110 adds 714 an entry to an action-reversal table (similar to the file deletion table 124) for the action. The service provider 110 then, on the service thread 204, performs 714 a COMMIT for this entry to make the entry permanent in the table. This will make the reversal of the action the default task to be performed by the service provider 110.

Operating under the application thread 702, the service provider 110 then deletes 718 the entry from the action-reversal table, with the intent of eliminating the request to perform the action. The permanence of this deletion will depend on the ultimate disposition of the transaction, and more specifically whether a COMMIT or ROLLBACK is ultimately executed by the application 102.

If the application 102 eventually performs 720 a ROLLBACK, thereby reversing work performed by the application 102, the application 102 will roll back the deletion of the entry, thereby adding it back to the action-reversal table. Note that at this time the action will still have been performed and not reversed. Similarly, the service provider 110 will be unaware that the application 102 has disposed of the transaction by performing a ROLLBACK.

In order to reverse the action designated in the action-reversal table, a cleanup thread 706 is executed by the service provider 110 at some future point in time. As shown, the service provider 110 may initially retrieve 722 entries from the action-reversal table that are older than some interval n. The interval n may be selected such as to allow the application 102 enough time to dispose of the transaction by performing either a COMMIT or a ROLLBACK. Once an entry older than some interval n has been retrieved, the service provider 110 reverses 724 the action designated by the entry. Finally, the service provider 110 deletes 726 the entry from the action-reversal table requesting the reversal of the action. The service provider 110 then performs 726 a COMMIT to make this change permanent. In this way, any action falling outside an application's commit coordinator may be reversed.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of code which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other implementations may not require all of the disclosed steps to achieve the desired functionality. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The invention claimed is:

1. A system to synchronize a database and a non-database resource, the system comprising:
    at least one processor; and
    at least one memory device coupled to the at least one processor and storing components for execution on the at least one processor, the components comprising:
        an application to transmit a request to a service provider to store an object as part of a transaction;
        a commit coordinator to ensure that the transaction completes in its entirety or not at all;
        the service provider configured to receive the request and store the object as a file in a repository not under control of the commit coordinator;
        the service provider further configured to insert an entry identifying the file into a file-deletion table under control of the commit coordinator, and make the insertion permanent by performing a COMMIT, the file-deletion table storing entries identifying files to remove from the repository;
        the service provider further configured to delete the entry from the file-deletion table without performing a COMMIT; and
        the application further configured to perform one of the following: (1) in the event the transaction is successful, make the delete permanent by performing a COMMIT; and (2) in the event the transaction is not successful, roll back the delete by performing a ROLLBACK.

2. The system of claim 1, wherein the service provider is further configured to remove the file from the repository in the event the entry remains in the file-deletion-table.

3. The system of claim 2, wherein the service provider is configured to wait a period n before deciding to remove the file from the repository.

4. The system of claim 1, wherein the service provider is further configured to not remove the file from the repository in the event the entry is permanently removed from the file-deletion-table.

5. The system of claim 4, wherein the service provider is configured to wait a period n before deciding to not remove the file from the repository.

6. The system of claim 1, wherein the service provider is configured to generate a unique identifier and associate the file with the unique identifier.

7. The system of claim 6, wherein the entry identifies the file using the unique identifier.

8. A method to synchronize a database and a non-database resource, the method comprising:
    transmitting a request to store an object as part of a transaction;
    providing a commit coordinator to ensure that the transaction completes in its entirety or not at all;
    receiving the request and storing the object as a file in a repository not under control of the commit coordinator;
    inserting an entry identifying the file into a file-deletion table under control of the commit coordinator, and making the insertion permanent by performing a COMMIT, the file-deletion table storing entries identifying files to remove from the repository;
    deleting the entry from the file-deletion table without performing a COMMIT; and
    performing one of the following: (1) in the event the transaction is successful, making the delete permanent by performing a COMMIT; and (2) in the event the transaction is not successful, rolling back the delete by performing a ROLLBACK.

9. The method of claim 8, further comprising removing the file from the repository in the event the entry remains in the file-deletion-table.

10. The method of claim 9, wherein removing the file further comprises waiting a period n before deciding to remove the file from the repository.

11. The method of claim 8, further comprising not removing the file from the repository in the event the entry is permanently deleted from the file-deletion-table.

12. The method of claim 11, wherein not removing the file further comprises waiting a period n before deciding to not remove the file from the repository.

13. The method of claim 8, wherein the repository is a file system.

14. The method of claim 8, further comprising generating a unique identifier and associating the file with the unique identifier.

15. The method of claim 14, wherein the entry identifies the file using the unique identifier.

16. A computer-readable medium having computer-usable program code embodied therein, the computer-usable program code comprising:
   computer-usable program code to transmit a request to store an object as part of a transaction;
   computer-usable program code to provide a commit coordinator to ensure that the transaction completes in its entirety or not at all;
   computer-usable program code to receive the request and store the object as a file in a repository not under control of the commit coordinator;
   computer-usable program code to insert an entry identifying the file into a file-deletion table under control of the commit coordinator, the file-deletion table storing entries identifying files to remove from the repository;
   computer-usable program code to make the insertion permanent by performing a COMMIT;
   computer-usable program code to delete the entry from the file-deletion table without performing a COMMIT; and
   computer-usable program code to perform one of the following: (1) in the event the transaction is successful, make the delete permanent by performing a COMMIT; and (2) in the event the transaction is not successful, roll back the delete by performing a ROLLBACK.

17. The computer-readable medium of claim 16, further comprising computer-usable program code to remove the file from the repository in the event the entry remains in the file-deletion-table.

18. The computer-readable medium of claim 17, further comprising computer-usable program code to wait a period n before deciding to remove the file from the repository.

19. The computer-readable medium of claim 16, further comprising computer-usable program code to not remove the file from the repository in the event the entry is permanently removed from the file-deletion-table.

20. The computer-readable medium of claim 19, further comprising computer-usable program code to wait a period n before deciding to not remove the file from the repository.

21. The computer-readable medium of claim 16, further comprising computer-usable program code to generate a unique identifier and associate the file with the unique identifier.

22. A system to synchronize a database and a non-database resource, the system comprising:
   at least one processor; and
   at least one memory device coupled to the at least one processor and storing components for execution on the at least one processor, the components comprising:
      an application to transmit a request to a service provider to perform an action as part of a transaction;
      a commit coordinator to ensure that the transaction completes in its entirety or not at all;
      the service provider configured to receive the request and perform the action, wherein the action is not under control of the commit coordinator;
      the service provider further configured to insert an entry identifying the action into an action-reversal table under control of the commit coordinator, and make the insertion permanent by performing a COMMIT, the action-reversal table storing entries identifying actions to reverse;
      the service provider further configured to delete the entry from the action-reversal table without performing a COMMIT; and
      the application further configured to perform one of the following: (1) in the event the transaction is successful, make the delete permanent by performing a COMMIT; and (2) in the event the transaction is not successful, roll back the delete by performing a ROLLBACK.

23. The system of claim 22, wherein the service provider is further configured to reverse the action in the event the entry remains in the action-reversal table.

24. A method to synchronize a database and a non-database resource, the method comprising:
   transmitting a request to perform an action as part of a transaction;
   providing a commit coordinator to ensure that the transaction completes in its entirety or not at all;
   receiving the request and performing the action, wherein the action is not under control of the commit coordinator;
   inserting an entry identifying the action into an action-reversal table under control of the commit coordinator, and making the insertion permanent by performing a COMMIT, the action-reversal table storing entries identifying actions to reverse;
   deleting the entry from the action-reversal table without performing a COMMIT; and
   performing one of the following: (1) in the event the transaction is successful, making the delete permanent by performing a COMMIT; and (2) in the event the transaction is not successful, rolling back the delete by performing a ROLLBACK.

25. The method of claim 24, further comprising reversing the action in the event the entry remains in the action-reversal table.

* * * * *